(12) United States Patent
Zhang

(10) Patent No.: US 10,879,810 B2
(45) Date of Patent: Dec. 29, 2020

(54) SYNCHRONOUS RECTIFIER OFF CONTROL MODULE AND SYNCHRONOUS RECTIFYING CONTROL CIRCUIT

(71) Applicant: Chengdu Monolithic Power Systems Co. Ltd., Chengdu (CN)

(72) Inventor: Tianzhu Zhang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 65 days.

(21) Appl. No.: 16/285,102

(22) Filed: Feb. 25, 2019

(65) Prior Publication Data
US 2019/0267906 A1 Aug. 29, 2019

(30) Foreign Application Priority Data
Feb. 27, 2018 (CN) .......................... 2018 1 0161619

(51) Int. Cl.
*H02M 3/335* (2006.01)
*H02M 1/08* (2006.01)
*H02M 1/00* (2006.01)

(52) U.S. Cl.
CPC ....... *H02M 3/33592* (2013.01); *H02M 1/083* (2013.01); *H02M 2001/0009* (2013.01); *H02M 2001/0058* (2013.01); *Y02B 70/10* (2013.01)

(58) Field of Classification Search
CPC ............. H02M 3/33592; H02M 1/083; H02M 2001/0009; H02M 2001/0058; Y02B 70/10
See application file for complete search history.

(56) References Cited

U.S. PATENT DOCUMENTS

| | | | |
|---|---|---|---|
| 2006/0114697 A1* | 6/2006 | Yasumura | H01F 3/14 363/16 |
| 2014/0268959 A1* | 9/2014 | Frohman | H02M 7/797 363/98 |
| 2014/0300329 A1* | 10/2014 | Thompson | H03K 5/1536 323/235 |
| 2015/0043249 A1* | 2/2015 | Iorio | H03K 17/133 363/21.03 |
| 2015/0318785 A1* | 11/2015 | Svorc | H02M 3/158 323/235 |
| 2016/0141951 A1* | 5/2016 | Mao | H02M 1/36 363/21.02 |

* cited by examiner

*Primary Examiner* — Adolf D Berhane
*Assistant Examiner* — Kevin H Sprenger
(74) *Attorney, Agent, or Firm* — Perkins Coie LLP

(57) ABSTRACT

A synchronous rectifier OFF control module and a synchronous rectifying control circuit. The synchronous rectifier OFF control module may receive a zero-cross threshold signal and a drain-source voltage signal indicative of a drain to source voltage of a synchronous rectifier, and to compare the drain-source voltage signal with the zero-cross threshold signal to determine whether the rectifier current flowing through the synchronous rectifier is crossing zero. The synchronous rectifier OFF control module may further receive a peak current detection signal indicative of a peak value of the rectifier current, and to adjust the magnitude of the zero-cross threshold signal to vary in the same direction as the peak value of the rectifier current based on the peak current detection signal. The synchronous rectifier OFF control module may provide more accurate control to the turn OFF moment of the synchronous rectifier and thus can help to reduce power loss.

20 Claims, 7 Drawing Sheets

SYNCHRONOUS RECTIFIER OFF CONTROL MODULE AND SYNCHRONOUS RECTIFYING CONTROL CIRCUIT

CROSS-REFERENCE TO RELATED APPLICATION(S)

This application claims the benefit of CN application No. 201810161619.9 filed on Feb. 27, 2018 and incorporated herein by reference.

TECHNICAL FIELD

This disclosure relates generally to electrical circuit, and more particularly but not exclusively relates to LLC resonant power converter and synchronous rectifier control module.

BACKGROUND

LLC resonant power converters are widely used in high current applications. For the sake of reducing power loss, diode(s) in secondary side of the LLC resonant converters are usually replaced with synchronous rectifier(s). However, in high current applications (e.g. where the valley-to-peak inductor current value could be as high as 45 A~90 A), a slew rate of a rectifier current flowing through a synchronous rectifier in LLC resonant converters may be quite high (e.g. as high as 1 A/ns~3 A/ns). For this situation, it is difficult to detect the exact point when the rectifier current crosses zero. No matter the detected zero cross point of the rectifier current is leading ahead of or lagging behind the actual zero cross point, it can result in decrease in efficiency of the LLC resonant converter.

SUMMARY

In accomplishing the above and other objects, there has been provided, in accordance with an embodiment of the present invention, a synchronous rectifier OFF control module comprising a comparison circuit and a zero-cross threshold regulation circuit. The comparison circuit may be configured to receive a zero-cross threshold signal and a drain-source voltage signal indicative of a drain to source voltage of a synchronous rectifier, and to compare the drain-source voltage signal with the zero-cross threshold signal to determine whether a rectifier current flowing through the synchronous rectifier is crossing zero. When the drain-source voltage signal reaches the zero-cross threshold signal, the synchronous rectifier OFF control module determines that the rectifier current is crossing zero and thus turns the synchronous rectifier OFF. The zero-cross threshold regulation circuit maybe configured to receive a peak current detection signal indicative of a peak value of the rectifier current, and to adjust the magnitude of the zero-cross threshold signal to vary in the same direction as the peak value of the rectifier current based on the peak current detection signal.

The zero-cross threshold regulation circuit may further be configured to receive a time indication signal indicative of a body diode on time, wherein the body diode on time represents the on time duration of a body diode of the synchronous rectifier when the synchronous rectifier is turned off. When the body diode on time is longer than a first predetermined time duration, the zero-cross threshold regulation circuit is configured to adjust the magnitude of the zero-cross threshold signal to decrease. When the body diode on time is shorter than a second predetermined time duration, the zero-cross threshold regulation circuit is configured to adjust the magnitude of the zero-cross threshold signal to increase.

The synchronous rectifier OFF control module may provide more accurate control to the turn OFF moment of the synchronous rectifier and thus can help to reduce power loss.

There has also been provided, in accordance with an embodiment of the present invention, a synchronous rectifying control circuit for controlling on and off switching of a first synchronous rectifier and a second synchronous rectifier. The synchronous rectifying control circuit is configured to receive/detect a first drain-source voltage signal indicative of a drain to source voltage of the first synchronous rectifier and a second drain-source voltage signal indicative of a drain to source voltage of the second synchronous rectifier, and to compare the first drain-source voltage signal with a first zero-cross threshold to detect whether a first rectifier current flowing through the first synchronous rectifier is crossing zero, and to compare the second drain-source voltage signal with a second zero-cross threshold signal to detect whether a second rectifier current flowing through the second synchronous rectifier is crossing zero. The synchronous rectifying control circuit is further configured to receive a first peak current detection signal indicative of a peak value of the first rectifier current and a second peak current detection signal indicative of a peak value of the second rectifier current, and to adjust a magnitude of the first zero-cross threshold signal to vary in the same direction as the peak value of the first rectifier current, and to adjust a magnitude of the second zero-cross threshold signal to vary in the same direction as the peak value of the second rectifier current.

The synchronous rectifying control circuit may further be configured to detect a first body diode on time of a first body diode of the first synchronous rectifier when the first synchronous rectifier is turned off, and to adjust the first zero-cross threshold signal based on the first body diode on time. If the first body diode on time is longer than a first predetermined time duration, the synchronous rectifying control circuit is configured to adjust the magnitude of the first zero-cross threshold signal to decrease. If the first body diode on time is shorter than a second predetermined time duration, the synchronous rectifying control circuit is configured to adjust the magnitude of the first zero-cross threshold signal to increase.

The synchronous rectifying control circuit may further be configured to detect a second body diode on time of a second body diode of the second synchronous rectifier when the second synchronous rectifier is turned off, and to adjust the second zero-cross threshold signal based on the second body diode on time. If the second body diode on time is longer than a third predetermined time duration, the synchronous rectifying control circuit is configured to adjust the magnitude of the second zero-cross threshold signal to decrease. If the second body diode on time is shorter than a fourth predetermined time duration, the synchronous rectifying control circuit is configured to adjust the magnitude of the second zero-cross threshold signal to increase.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
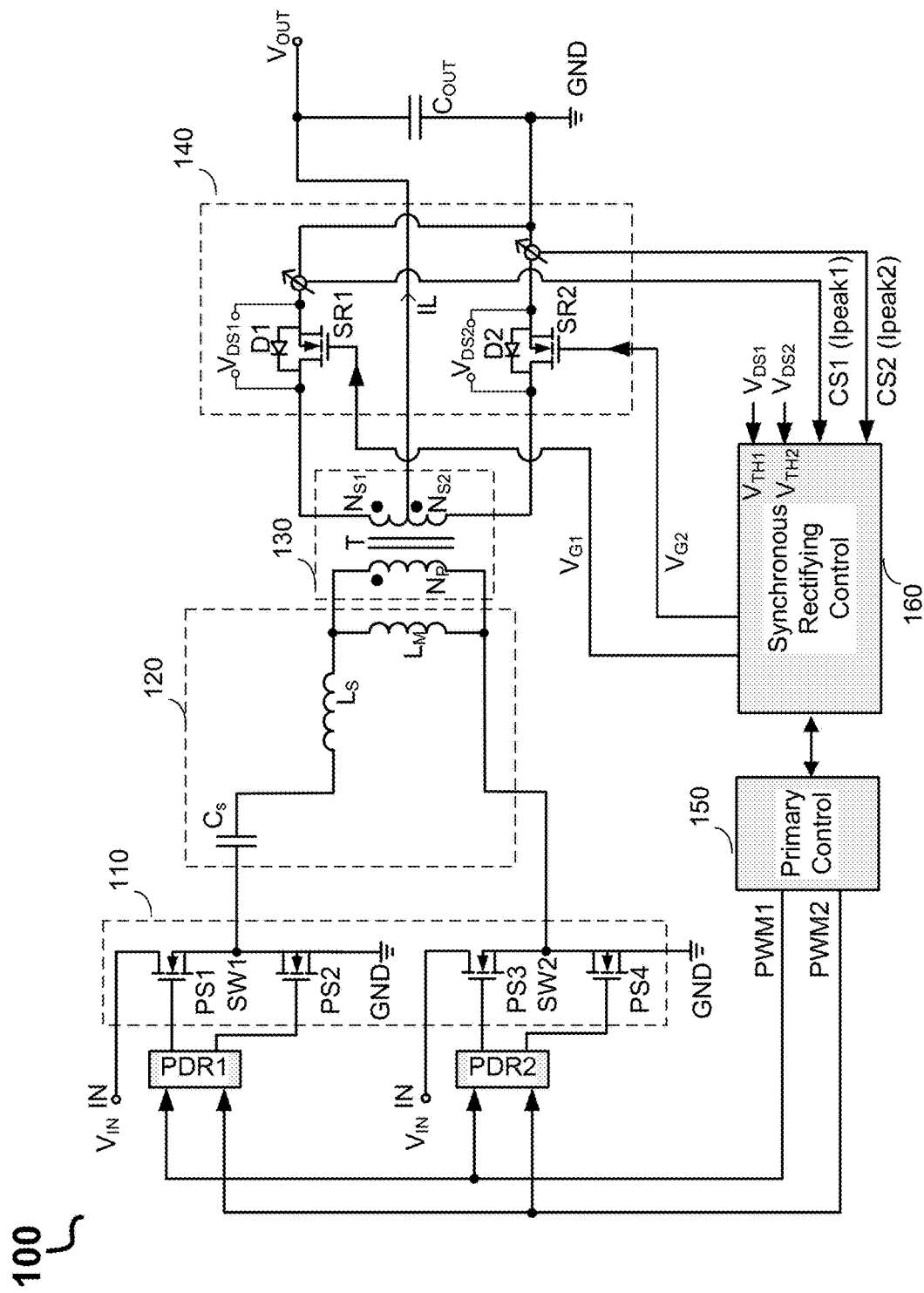
FIG. 1 illustrates a block diagram of a LLC resonant converter 100 in accordance with an embodiment of the present invention.

FIG. 1 illustrates a block diagram of a LLC resonant converter 100 in accordance with an embodiment of the present invention. The LLC resonant converter 100 may comprise: a bridge circuit 110, a LLC resonant circuit 120, a transformer 130, a rectification circuit 140, a primary control circuit 150 and a synchronous rectifying control circuit 160.

The bridge circuit 110 may have a full bridge topology, coupled between an input terminal IN and a reference ground GND. The full bridge topology may comprise a first pair of power switches PS1 and PS2 coupled in series between the input terminal IN and the reference ground GND, and a second pair of power switches PS3 and PS4 coupled in series between the input terminal IN and the reference ground GND. The input terminal IN may be configured to receive an input voltage VIN. The first pair of power switches PS1 and PS2 may be operated to perform on and off switching in complementary with a same duty cycle (e.g. a duty cycle of 50%), wherein the power switch PS2 is off when the power switch PS1 is on, and vice versa. The second pair of power switches PS3 and PS4 may also be operated to perform on and off switching in complementary with a same duty cycle (e.g. a duty cycle of 50%), wherein the power switch PS3 is off when the power switch PS4 is on, and vice versa. In an alternative embodiment, the bridge circuit 110 may have a half bridge topology, e.g. comprising the first pair of power switches PS1 and PS2 coupled in series between the input terminal IN and the reference ground GND.

The LLC resonant circuit 120 may be coupled to the bridge circuit 110 and may comprise a first capacitor CS, a first inductor LS and a second inductor LM, coupled in series between a common connection SW1 of the first pair of power switches PS1 and PS2 and a common connection SW2 of the second pair of power switches PS3 and PS4. The second inductor LM may comprise a field winding of the transformer 130. In other embodiments, the second inductor LM may be integrated into the transformer 130. In other embodiments where the bridge circuit 110 having a half bridge topology, the first capacitor CS, the first inductor LS and the second inductor LM may be coupled in series between the common connection SW1 of the first pair of power switches PS1 and PS2 and the reference ground GND.

The transformer 130 may have a primary winding NP coupled to the LLC resonant circuit 120, and a secondary winding coupled to the rectification circuit 140. The secondary winding may comprise a first secondary winding NS1 and a second secondary winding NS2 coupled in series with the non-dotted terminal of the first secondary winding NS1 connected to the dotted terminal of the second secondary winding NS2.

The rectification circuit 140 may at least comprise a pair of synchronous rectifiers. In an embodiment, the rectification circuit 140 may comprise a first synchronous rectifier SR1 and a second synchronous rectifier SR2. A source of the first synchronous rectifier SR1 and a source of the second synchronous rectifier SR2 may both be coupled to a first terminal of the output capacitor COUT and the reference ground GND. A drain of the first synchronous rectifier SR1 may be coupled to the dotted terminal of the first secondary winding NS1. A drain of the second synchronous rectifier SR2 may be coupled to the non-dotted terminal of the second secondary winding NS2. A common connection of the first secondary winding NS1 and the second secondary winding NS2 (the common connection formed by the non-dotted terminal of the first secondary winding NS1 and the dotted terminal of the second secondary winding NS2) may be coupled to a second terminal of the output capacitor COUT, and may be configured as an output terminal of the LLC resonant converter 100 to provide an output voltage VOUT.

The primary control circuit 150 may be configured to control the on and off switching of the first pair of power switches PS1 and PS2 as well as the on and off switching of the second pair of power switches PS3 and PS4. The primary control circuit 150 may be configured to provide a first primary pulse width modulation signal PWM1 and a second primary pulse width modulation signal PWM2 to a first driver PDR1. The first driver PDR1 may be configured to drive the first pair of power switches PS1 and PS2 to perform on and off switching in complementary with the same duty cycle. The primary control circuit 150 may further be configured to provide the first primary pulse width modulation signal PWM1 and the second primary pulse width modulation signal PWM2 to a second driver PDR2. The second driver PDR2 may be configured to drive the second pair of power switches PS3 and PS4 to perform on and off switching in complementary with the same duty cycle.

The synchronous rectifying control circuit 160 may be configured to control on and off switching of the first synchronous rectifier SR1 and the second synchronous rectifier SR2 to convert an AC voltage at the primary side of the transformer 130 to the DC output voltage VOUT. In accordance with an embodiment of the present invention, the synchronous rectifying control circuit 160 may be configured to receive/detect a first drain-source voltage signal VDS1 indicative of a drain to source voltage of the first synchronous rectifier SR1, a second drain-source voltage signal VDS2 indicative of a drain to source voltage of the second synchronous rectifier SR2, a first peak current detection signal Ipeak1 indicative of a peak value of a first rectifier current ISR1 flowing through the first synchronous rectifier SR1, and a second peak current detection signal Ipeak2 indicative of a peak value of a second rectifier current ISR2 flowing through the second synchronous rectifier SR2. The synchronous rectifying control circuit 160 may be configured to compare the first drain-source voltage signal VDS1 with a first zero-cross threshold signal VTH1 to detect whether the first rectifier current ISR1 is crossing zero. The synchronous rectifying control circuit 160 may also be configured to compare the second drain-source voltage signal VDS2 with a second zero-cross threshold signal VTH2 to detect whether the second rectifier current ISR2 is crossing zero. Technically, the first zero-cross threshold signal VTH1 and the second zero-cross threshold signal VTH2 are both zero (e.g. equal to the potential of the reference ground GND). However, due to existing of parasitic elements, circuit delays and other factors in practical implementation circuitry, the detected zero-cross point of the first rectifier current ISR1 and the detected zero-cross point of the second rectifier current ISR2 may not be the exact actual zero-cross points. For instance, the detected zero-cross point of the first rectifier current ISR1 is related to the peak value of the first rectifier current ISR1. Higher peak value of the first rectifier current ISR1 means higher slew rate (i.e. change rate in the first rectifier current ISR1 versus time) of the first rectifier current ISR1, which leads to larger deviation of the detected zero-cross point from the actual zero-cross point of the first rectifier current ISR1. Similarly, higher peak value of the second rectifier current ISR2 leads to larger deviation of the detected zero-cross point from the actual zero-cross point of the second rectifier current ISR2. To eliminate or at least to reduce the deviation between the detected zero-cross point and the actual zero-cross point of the first rectifier current ISR1, the synchronous rectifying control circuit 160 in accordance with an embodiment of the present invention may be configured to adjust a magnitude of the first zero-cross threshold signal VTH1 to vary in the same direction as the peak value of the first rectifier current ISR1. That is to say, the synchronous rectifying control circuit 160 may be configured to adjust the magnitude of the first zero-cross threshold signal VTH1 to increase with the peak value of the first rectifier current ISR1 increasing and to decrease with the peak value of the first rectifier current ISR1 decreasing. To eliminate or at least to reduce the deviation between the detected zero-cross point and the actual zero-cross point of the second rectifier current ISR2, the synchronous rectifying control circuit 160 in accordance with an embodiment of the present invention may further be configured to adjust a magnitude of the second zero-cross threshold signal VTH2 to vary in the same direction as the peak value of the second rectifier current ISR2. That is to say, the synchronous rectifying control circuit 160 may be configured to adjust the magnitude of the second zero-cross threshold signal VTH2 to increase with the peak value of the second rectifier current ISR2 increasing and to decrease with the peak value of the second rectifier current ISR2 decreasing. In accordance with an embodiment of the present invention, once the first drain-source voltage signal VDS1 reaches the first zero-cross threshold signal VTH1, the synchronous rectifying control circuit 160 may determine that the first rectifier current ISR1 is crossing zero and thus may be configured to turn the first rectifier SR1 off. Once the second drain-source voltage signal VDS2 reaches the second zero-cross threshold signal VTH2, the synchronous rectifying control circuit 160 may determine that the second rectifier current ISR2 is crossing zero and thus may be configured to turn the second rectifier SR2 off. The synchronous rectifying control circuit 160 in accordance with various embodiments of the present invention may provide more accurate control to the turn OFF moment of the first synchronous rectifier SR1 and the second synchronous rectifier SR2 of the LLC resonant converter 100 and thus can help to reduce the power loss.

Figure 2:
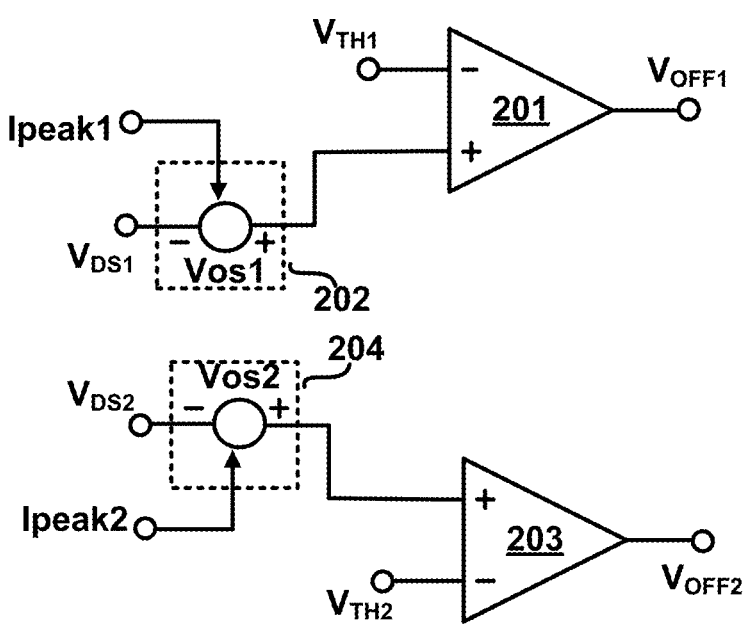
FIG. 2 illustrates a schematic diagram of a synchronous rectifying control circuit 160 in accordance with an embodiment of the present invention.

In accordance with an exemplary embodiment as shown in FIG. 2, the synchronous rectifying control circuit 160 may comprise a first synchronous rectifier OFF control module. The first synchronous rectifier OFF control module may comprise a first comparison circuit 201 and a first zero-cross threshold regulation circuit 202. The first comparison circuit 201 may be configured to receive/detect the first drain-source voltage signal VDS1 and the first zero-cross threshold signal VTH1, and to compare the first drain-source voltage signal VDS1 with the first zero-cross threshold signal VTH1 to determine whether the first rectifier current ISR1 is crossing zero. When the first drain-source voltage signal VDS1 reaches the first zero-cross threshold signal VTH1, the first synchronous rectifier OFF control module determines that the first rectifier current ISR1 is crossing zero and thus turns the first synchronous rectifier SR1 OFF. The first comparison circuit 201 may be configured to provide a first OFF control signal VOFF1 based on comparison of the first drain-source voltage signal VDS1 with the first zero-cross threshold signal VTH1, wherein when the first drain-source voltage signal VDS1 reaches the first zero-cross threshold signal VTH1, the first synchronous rectifier OFF control module is configured to trigger a first gate control signal VG1 to turn the first synchronous rectifier OFF based on the first OFF control signal VOFF1. The first zero-cross threshold regulation circuit 202 may be configured to receive the first peak current detection signal Ipeak1, and to adjust the magnitude of the first zero-cross threshold signal VTH1 to vary in the same direction as the peak value of the first rectifier current ISR1 based on the first peak current detection signal Ipeak1.

In accordance with an exemplary embodiment as shown in FIG. 2, the synchronous rectifying control circuit 160 may further comprise a second synchronous rectifier OFF control module. The second synchronous rectifier OFF control module may comprise a second comparison circuit 203 and a second zero-cross threshold regulation circuit 204. The second comparison circuit 203 may be configured to receive/detect the second drain-source voltage signal VDS2 and the second zero-cross threshold signal VTH2, and to compare the second drain-source voltage signal VDS2 with the second zero-cross threshold signal VTH2 to determine whether the second rectifier current ISR2 crosses zero. When the second drain-source voltage signal VDS2 reaches the second zero-cross threshold signal VTH2, the second synchronous rectifier OFF control module determines that the second rectifier current ISR2 is crossing zero and thus turn the second synchronous rectifier SR2 OFF. The second comparison circuit 203 may be configured to provide a second OFF control signal VOFF2 based on comparison of the second drain-source voltage signal VDS2 with the second zero-cross threshold signal VTH2, wherein when the second drain-source voltage signal VDS2 reaches the second zero-cross threshold signal VTH2, the second synchronous rectifier OFF control module is configured to trigger a second gate control signal VG2 to turn the second synchronous rectifier OFF based on the second OFF control signal VOFF2. The second zero-cross threshold regulation circuit 204 may be configured to receive the second peak current detection signal Ipeak2, and to adjust the magnitude of the second zero-cross threshold signal VTH2 to vary in the same direction as the peak value of the second rectifier current ISR2 based on the second peak current detection signal Ipeak2.

In accordance with an embodiment of the present invention, the first zero-cross threshold regulation circuit 202 may be configured to adjust the magnitude of the first zero-cross threshold signal VTH1 through superposing a first threshold bias Vos1 to the first drain-source voltage signal VDS1 or to the first zero-cross threshold signal VTH1. In the example of FIG. 2, the first threshold bias Vos1 is superposed to the first drain-source voltage signal VDS1. The first threshold bias Vos1 has a magnitude varying in the same direction as the peak value of the first rectifier current ISR1 (i.e. The magnitude of the first threshold bias Vos1 increases with the peak value of the first rectifier current ISR1 increasing and decreases with the peak value of the first rectifier current ISR1 decreasing). During the turn OFF control of the first synchronous rectifier SR1, the first synchronous rectifier SR1 generally should be turned OFF once the first drain-source voltage signal VDS1 is crossing zero from a negative value. Therefore, in an embodiment wherein the first zero-cross threshold regulation circuit 202 adjusts the magnitude of the first zero-cross threshold signal VTH1 through superposing the first threshold bias Vos1 to the first drain-source voltage signal VDS1, the first threshold bias Vos1 should be a positive bias. In an embodiment wherein the first zero-cross threshold regulation circuit 202 adjusts the magnitude of the first zero-cross threshold signal VTH1 through superposing the first threshold bias Vos1 to the first zero-cross threshold signal VTH1, the first threshold bias Vos1 should be a negative bias. In an exemplary embodiment, the first threshold bias Vos1 may be controlled by the first peak current detection signal Ipeak1. In accordance with an embodiment of the present invention, the second zero-cross threshold regulation circuit 204 may be configured to adjust the magnitude of the second zero-cross threshold signal VTH2 through superposing a second threshold bias Vos2 to the second drain-source voltage signal VDS2 or to the second zero-cross threshold signal VTH2 (In the example of FIG. 2, the second threshold bias Vos2 is superposed to the second drain-source voltage signal VDS2). The second threshold bias Vos2 has a magnitude varying in the same direction as the peak value of the second rectifier current ISR2 (i.e. The magnitude of the second threshold bias Vos2 increases with the peak value of the second rectifier current ISR2 increasing and decreases with the peak value of the second rectifier current ISR2 decreasing). During the turn OFF control of the second synchronous rectifier SR2, the second synchronous rectifier SR2 generally should be turned OFF once the second drain-source voltage signal VDS2 is crossing zero from a negative value. Therefore, in an embodiment wherein the second zero-cross threshold regulation circuit 204 adjusts the magnitude of the second zero-cross threshold signal VTH2 through superposing the second threshold bias Vos2 to the second drain-source voltage signal VDS2, the second threshold bias Vos2 should be a positive bias. In an embodiment wherein the second zero-cross threshold regulation circuit 204 adjusts the magnitude of the second zero-cross threshold signal VTH2 through superposing the second threshold bias Vos2 to the second zero-cross threshold signal VTH2, the second threshold bias Vos2 should be a negative bias. In an exemplary embodiment, the second threshold bias Vos2 may be controlled by the second peak current detection signal Ipeak2.

Figure 3:
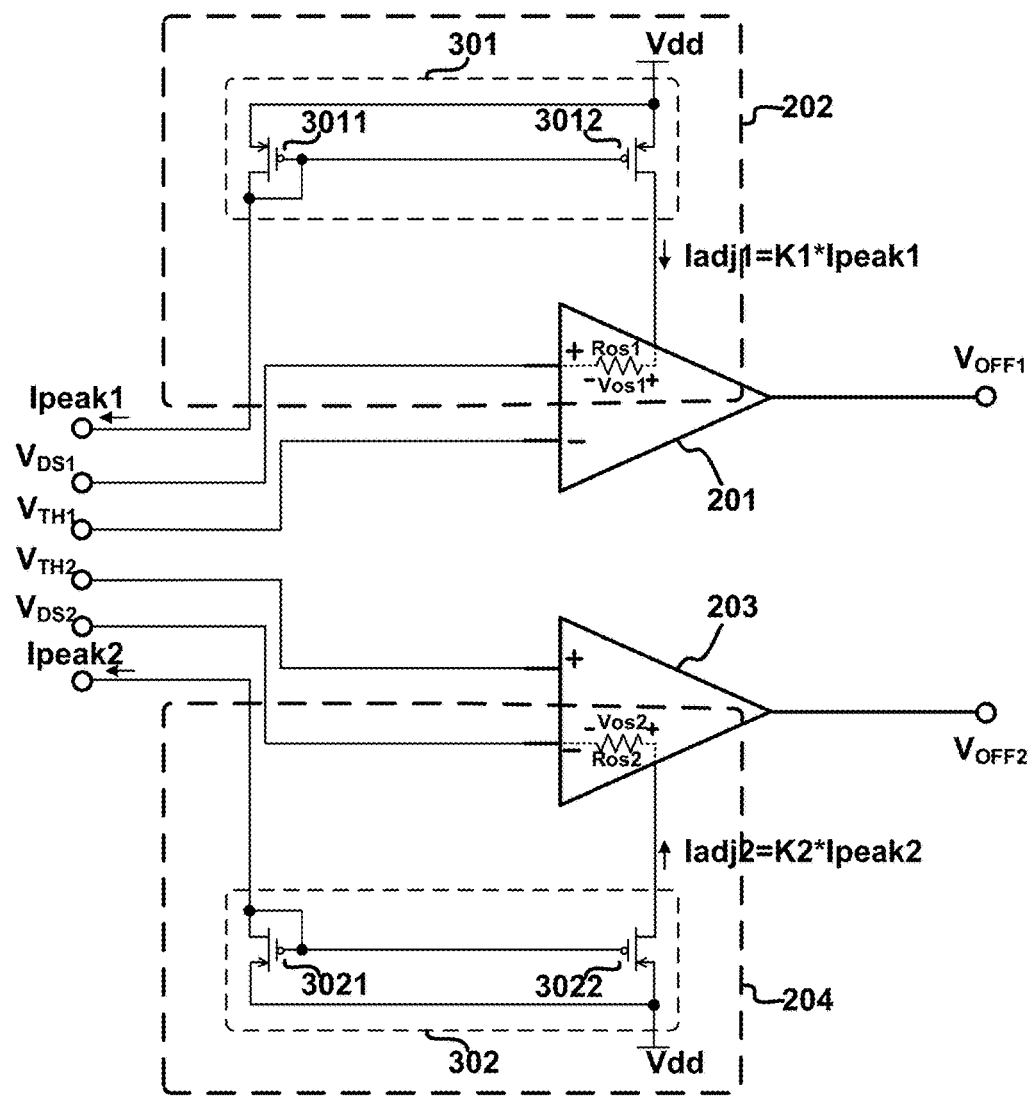
FIG. 3 illustrates a schematic diagram of a synchronous rectifying control circuit 160 in accordance with an alternative embodiment of the present invention.

FIG. 3 illustrates a schematic diagram of the synchronous rectifying control circuit 160 in accordance with an embodiment of the present invention. In this exemplary embodiment, the first zero-cross threshold regulation circuit 202 may comprise a first current mirror circuit 301 and a first bias resistor Ros1. The first current mirror circuit 301 may be configured to receive the first peak current detection signal Ipeak1 and to mirror the first peak current detection signal Ipeak1 with a first coefficient K1 to provide a first adjusting current Iadj1 (i.e. Iadj1=K1*Ipeak1). The first bias resistor Ros1 may have a first terminal configured to receive the first drain-source voltage signal VDS1 or the first zero-cross threshold signal VTH1 (in the example of FIG. 3, it is illustrated to receive the first drain-source voltage signal VDS1) and a second terminal configured to receive the first adjusting current Iadj1. The first bias resistor Ros1 is configured to provide a voltage drop resulted from the first adjusting current Iadj1 flowing through the first bias resistor Ros1 as the first threshold bias Vos1. In accordance with an embodiment of the present invention, the first comparison circuit 201 may have a first offset resistor (also labeled with Ros1 for simplicity). The first offset resistor Ros1 of the first comparison circuit 201 may be used as the first bias resistor Ros1 and the first threshold bias Vos1 may be generated through regulating the first adjusting current Iadj1 flowing through the first offset resistor Ros1. One of ordinary skill in the art should understand that this is not intended to be limiting. In other embodiments, the first bias resistor Ros1 may comprise other alternative elements inside or outside the first comparison circuit 201 that could be used as a resistor. In the example of FIG. 3, the first current mirror circuit 301 may comprise a current mirror comprising e.g. a first mirror transistor 3011 and a second mirror transistor 3012 connected as shown in FIG. 3.

Similarly, still referring to FIG. 3, the second zero-cross threshold regulation circuit 204 may comprise a second current mirror circuit 302 and a second bias resistor Ros2. The second current mirror circuit 302 may be configured to receive the second peak current detection signal Ipeak2 and to mirror the second peak current detection signal Ipeak2 with a second coefficient K2 to provide a second adjusting current Iadj2 (i.e. Iadj2=K2*Ipeak2). The second bias resistor Ros2 may have a first terminal configured to receive the second drain-source voltage signal VDS2 or the second zero-cross threshold signal VTH2 (in the example of FIG. 3, it is illustrated to receive the second drain-source voltage signal VDS2) and a second terminal configured to receive the second adjusting current Iadj2. The second bias resistor Ros2 is configured to provide a voltage drop resulted from the second adjusting current Iadj2 flowing through the second bias resistor Ros2 as the second threshold bias Vos2. In accordance with an embodiment of the present invention, the second comparison circuit 203 may have a second offset resistor (also labeled with Ros2 for simplicity). The second offset resistor Ros2 of the second comparison circuit 203 may be used as the second bias resistor Ros2 and the second threshold bias Vos2 may be generated through regulating the second adjusting current Iadj2 flowing through the second offset resistor Ros2. One of ordinary skill in the art should understand that this is not intended to be limiting. In other embodiments, the second bias resistor Ros2 may comprise other alternative elements inside or outside the second comparison circuit 203 that could be used as a resistor. In the example of FIG. 3, the second current mirror circuit 302 may comprise a current mirror comprising e.g. a third mirror transistor 3021 and a fourth mirror transistor 3022 connected as shown in FIG. 3.

One of ordinary skill in the art should understand that the synchronous rectifying control circuit 160, the first synchronous rectifier OFF control module, and the synchronous rectifier OFF control module described with reference to FIG. 2 and FIG. 3 are illustrative and not limiting.

In accordance with an embodiment of the present invention, the synchronous rectifying control circuit 160 may further detect anon time tFD1 (a first body diode on time tFD1) of a first body diode D1 of the first synchronous rectifier SR1 when the first synchronous rectifier SR1 is turned off in a current switching cycle TC, and to adjust the first zero-cross threshold signal VTH1 of a next switching cycle TN based on the first body diode on time tFD1. A switching cycle here may refer to a time duration for the first synchronous rectifier SR1 to complete one cycle of on and off switching.

Figure 4:
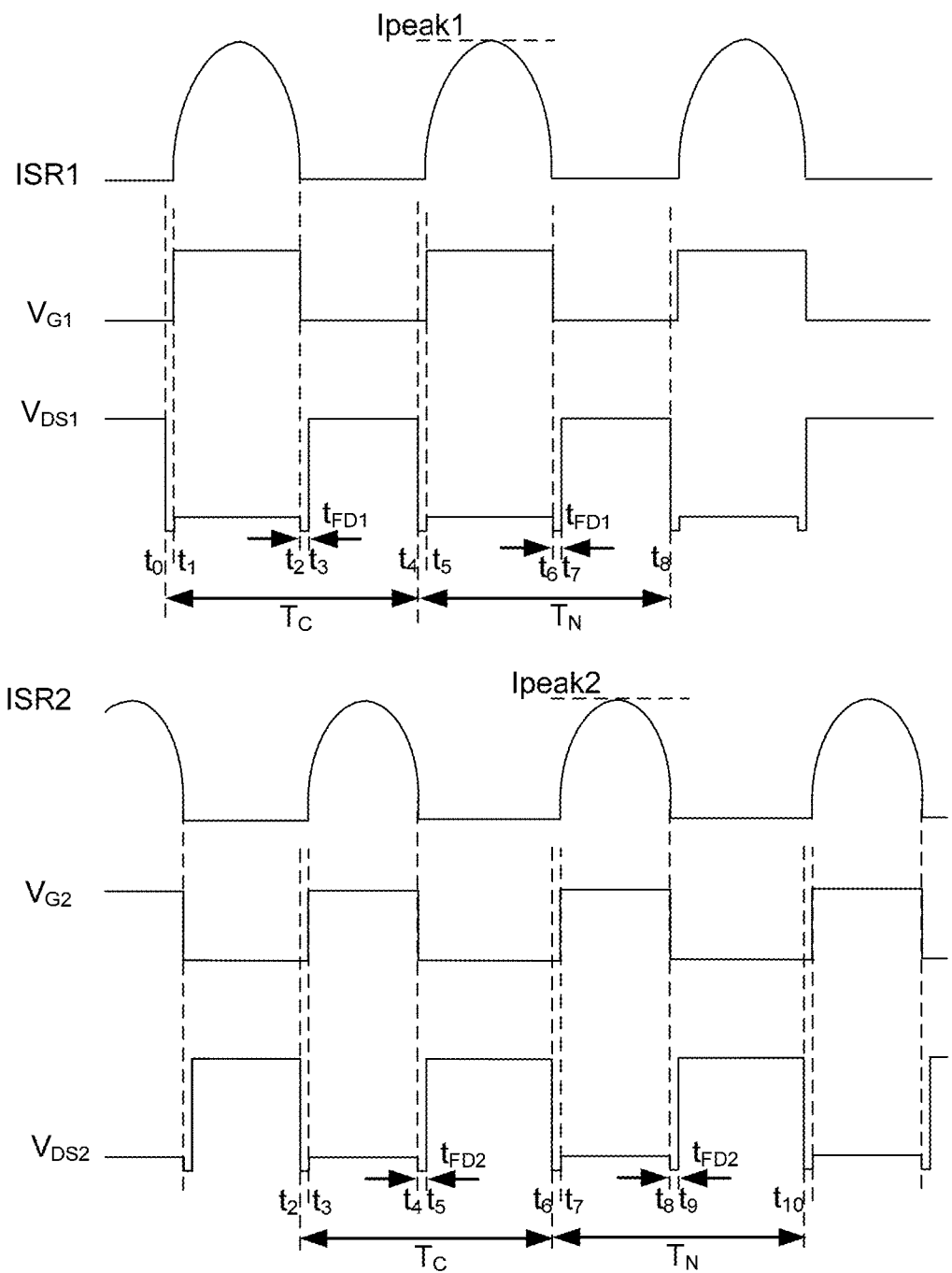
FIG. 4 illustrates a waveform diagram showing operation of the first synchronous rectifier SR1 and the second synchronous rectifier SR2 of the LLC resonant converter 100 in accordance with an embodiment of the present invention.

FIG. 4 illustrates a waveform diagram showing operation of the first synchronous rectifier SR1 and the second synchronous rectifier SR2 of the LLC resonant converter 100 in accordance with an embodiment of the present invention. When a current flowing in the negative direction in the primary winding NP, the second synchronous rectifier SR2 is off. At time t0, a first body diode D1 of the first synchronous rectifier SR1 turns on in the first place. For this situation, a rectification current IL flows through the first secondary winding NS1 of the transformer 130 and the first body diode D1, thus the first drain-source voltage signal VDS1 is indicative of a forward conduction voltage of the first body diode D1. At time t1, the synchronous rectifying control circuit 160 may be configured to trigger the first gate control signal VG1 to drive the first synchronous rectifier SR1 on. For this situation, the rectification current IL flows through the first secondary winding NS1 of the transformer 130 and the first synchronous rectifier SR1. After the first synchronous rectifier SR1 is on, the first drain-source voltage signal VDS1 is indicative of the drain to source conduction voltage drop of the first synchronous rectifier SR1, and thus the absolute value of the first drain-source voltage signal VDS1 increases with the first rectifier current ISR1 (the rectification current IL) increasing and decreases with the first rectifier current ISR1 decreasing.

At time t2, the first drain-source voltage signal VDS1 reaches the first zero-cross threshold signal VTH1, thus the synchronous rectifying control circuit 160 determines that the first rectifier current ISR1 is crossing zero and consequently turns the first rectifier SR1 off. That is to say, time t2 is the moment when the synchronous rectifying control circuit 160 detects that the first rectifier current ISR1 is crossing zero, (i.e. time t2 is the detected zero-cross point of the first rectifier current ISR1). Since the first synchronous rectifier SR1 is turned off at time t2, the first body diode D1 of the first synchronous rectifier SR1 will be on for a time duration from time t2 to time t3, which may be referred to as the first body diode on time tFD1. The first body diode on time tFD1 represents the on time duration of the first body diode D1 when the first synchronous rectifier SR1 is turned off in the current switching cycle TC. If the detected zero-cross point of the first rectifier current ISR1 is leading ahead of its actual zero-cross point in the current switching cycle TC (while ideally the detected zero-cross point should be coincident with the actual zero-cross point), the first body diode on time tFD1 becomes longer than ideally expected, resulting in higher power loss. For this situation, it is desired that in the next switching cycle TN, the detected zero-cross point of the first rectifier current ISR1 gets closer to the actual zero-cross point to reduce the first body diode on time tFD1. This could be realized by adjusting the magnitude of the first zero-cross threshold signal VTH1 to decrease in the next switching cycle TN based on the first body diode on time tFD1 of the current switching cycle TC. The synchronous rectifying control circuit 160 may be configured to compare the first body diode on time tFD1 with a first predetermined time duration tS1 to determine whether the detected zero-cross point of the first rectifier current ISR1 is leading ahead of its actual zero-cross point. The first predetermined time duration tS1 may be set according to practical application requirements. For instance, in an embodiment, the first predetermined time duration tS1 may be set to a maximum permitted on time duration for the first body diode D1 when the first synchronous rectifier SR1 is turned off. In an embodiment, the first predetermined time duration tS1 may be 7 ns~10 ns. If the first body diode on time tFD1 is longer than the first predetermined time duration tS1, the synchronous rectifying control circuit 160 determines that the detected zero-cross point of the first rectifier current ISR1 is leading ahead of the actual zero-cross point of the first rectifier current ISR1, and thus adjusts the magnitude of the first zero-cross threshold signal VTH1 of the next switching cycle TN to decrease. If the detected zero-cross point of the first rectifier current ISR1 is lagging behind its actual zero-cross point in the current switching cycle TC, the first body diode on time tFD1 becomes shorter than ideally expected, resulting in another undesired turn on of the first synchronous rectifier and higher power loss. For this situation, it is desired that in the next switching cycle TN, the detected zero-cross point of the first rectifier current ISR1 gets closer to the actual zero-cross point to increase the first body diode on time tFD1. This could be realized by adjusting the magnitude of the first zero-cross threshold signal VTH1 to increase in the next switching cycle TN based on the first body diode on time tFD1 of the current switching cycle TC. The synchronous rectifying control circuit 160 may be configured to compare the first body diode on time tFD1 with a second predetermined time duration tS2 to determine whether the detected zero-cross point of the first rectifier current ISR1 is lagging behind its actual zero-cross point. The second predetermined time duration tS2 may be set according to practical application requirements. For instance, in an embodiment, the second predetermined time duration tS2 may be set to a minimum permitted on time duration for the first body diode D1 when the first synchronous rectifier SR1 is turned off. In an embodiment, the first predetermined time duration tS1 may be 1 ns~3 ns. If the first body diode on time tFD1 is shorter than the second predetermined time duration tS2, the synchronous rectifying control circuit 160 determines that the detected zero-cross point of the first rectifier current ISR1 is lagging behind the actual zero-cross point of the first rectifier current ISR1, and thus adjusts the magnitude of the first zero-cross threshold signal VTH1 of the next switching cycle TN to increase.

From time t2 on, a current flowing in the positive direction in the primary winding NP of the transformer 130, the first synchronous rectifier SR1 keeps off and the second synchronous rectifier SR2 operates. Until time t4, a current flows in the negative direction in the primary winding NP again, the first synchronous rectifier SR1 enters into the next switching cycle TN. Operation of the first synchronous rectifier SR1 in the next switching cycle TN is similar as in the current switching cycle TC. Time t4, t5, t6, t7 and t8 of the next switching cycle TN may respectively correspond to time t0, t1, t2, t3 and t4 of the current switching cycle TC, and thus will not be addressed herein again. The synchronous rectifying control circuit 160 detects the first body diode on time tFD1 and adaptively adjusts the first zero-cross threshold signal VTH1 of the next switching cycle TN based on the first body diode on time tFD1 of the current switching cycle TC switching cycle by switching cycle. In this fashion, the first zero-cross threshold signal VTH1 of the next switching cycle TN may be able to reflect the actual zero-cross point of the first rectifier current ISR1 more and more accurately. Consequently, the synchronous rectifying control circuit 160 may be able to control the turn off moment of the first synchronous rectifier SR1 more accurately.

Analogously, the synchronous rectifying control circuit 160 may be configured to further detect an on time tFD2 (a second body diode on time tFD2) of a second body diode D2 of the second synchronous rectifier SR2 when the second synchronous rectifier SR2 is turned off in a current switching cycle TC, and to adjust the second zero-cross threshold signal VTH2 of a next switching cycle TN based on the second body diode on time tFD2. A switching cycle here may refer to a time duration for the second synchronous rectifier SR2 to complete one cycle of on and off switching. Still referring to FIG. 4, when a current flowing in the positive direction in the primary winding NP of the transformer 130 (for instance from time t2 to time t4 in FIG. 4), the first synchronous rectifier SR1 is off. Operation process of the second synchronous rectifier SR2 from time t2 to time t4 is similar as that of the first synchronous rectifier from time t0 to time t2 and thus will not be addressed again. At time t4, the second drain-source voltage signal VDS2 reaches the second zero-cross threshold signal VTH2, thus the synchronous rectifying control circuit 160 determines that the second rectifier current ISR2 is crossing zero and consequently turns the second rectifier SR2 OFF. That is to say, time t4 is the moment when the synchronous rectifying control circuit 160 detects that the second rectifier current ISR2 is crossing zero, (i.e. time t4 is the detected zero-cross point of the second rectifier current ISR2). Since the second synchronous rectifier SR2 is turned off at time t4, the second body diode D2 of the second synchronous rectifier SR2 will be on for a time duration from time t4 to time t5, which may be referred to as the second body diode on time tFD2. The second body diode on time tFD2 represents the on time duration of the second body diode D2 when the second synchronous rectifier SR2 is turned off in the current switching cycle TC. If the detected zero-cross point of the second rectifier current ISR2 is leading ahead of its actual zero-cross point in the current switching cycle TC (while ideally the detected zero-cross point should be coincident with the actual zero-cross point), the second body diode on time tFD2 becomes longer than ideally expected, resulting in higher power loss. For this situation, it is desired that in the next switching cycle TN, the detected zero-cross point of the second rectifier current ISR2 gets closer to the actual zero-cross point to reduce the second body diode on time tFD2. This could be realized by adjusting the magnitude of the second zero-cross threshold signal VTH2 to decrease in the next switching cycle TN based on the second body diode on time tFD2 of the current switching cycle TC. The synchronous rectifying control circuit 160 may be configured to compare the second body diode on time tFD2 with a third predetermined time duration tS3 to determine whether the detected zero-cross point of the second rectifier current ISR2 is leading ahead of its actual zero-cross point. The third predetermined time duration tS3 may be set according to practical application requirements. For instance, in an embodiment, the third predetermined time duration tS3 may be set to a maximum permitted on time duration for the second body diode D2 when the second synchronous rectifier SR2 is turned off. In an embodiment, the third predetermined time duration tS3 may be 7 ns~10 ns. If the second body diode on time tFD2 is greater than the third predetermined time duration tS3, the synchronous rectifying control circuit 160 determines that the detected zero-cross point of the second rectifier current ISR2 is leading ahead of the actual zero-cross point of the second rectifier current ISR2, and thus adjusts the magnitude of the second zero-cross threshold signal VTH2 of the next switching cycle TN to decrease. If the detected zero-cross point of the second rectifier current ISR2 is lagging behind its actual zero-cross point in the current switching cycle TC, the second body diode on time tFD2 becomes shorter than ideally expected, resulting in another undesired turn on of the second synchronous rectifier and higher power loss. For this situation, it is desired that in the next switching cycle TN, the detected zero-cross point of the second rectifier current ISR2 gets closer to the actual zero-cross point to increase the second body diode on time tFD2. This could be realized by adjusting the magnitude of the second zero-cross threshold signal VTH2 to increase in the next switching cycle TN based on the second body diode on time tFD2 of the current switching cycle TC. The synchronous rectifying control circuit 160 may be configured to compare the second body diode on time tFD2 with a fourth predetermined time duration tS4 to determine whether the detected zero-cross point of the second rectifier current ISR2 is lagging behind its actual zero-cross point. The fourth predetermined time duration tS4 may be set according to practical application requirements. For instance, in an embodiment, the fourth predetermined time duration tS4 may be set to a minimum permitted on time duration for the second body diode D2 when the second synchronous rectifier SR2 is turned off. In an embodiment, the fourth predetermined time duration tS4 may be 1 ns~3 ns. If the second body diode on time tFD2 is shorter than the fourth predetermined time duration tS4, the synchronous rectifying control circuit 160 determines that the detected zero-cross point of the second rectifier current ISR2 is lagging behind the actual zero-cross point of the second rectifier current ISR2, and thus adjusts the magnitude of the second zero-cross threshold signal VTH2 of the next switching cycle TN to increase.

From time t4 on, a current flowing in the negative direction in the primary winding NP of the transformer 130, the second synchronous rectifier SR2 keeps off and the first synchronous rectifier SR1 operates. Until time t6, a current flows in the positive direction in the primary winding NP again, the second synchronous rectifier SR2 enters into the next switching cycle TN. Operation of the second synchronous rectifier SR2 in the next switching cycle TN is similar as in the current switching cycle TC. Time t6, t7, t8, t9 and t10 of the next switching cycle TN may respectively correspond to time t2, t3, t4, t5 and t6 of the current switching cycle TC, and thus will not be addressed herein again. The synchronous rectifying control circuit 160 detects the second body diode on time tFD2 and adaptively adjusts the second zero-cross threshold signal VTH2 of the next switching cycle TN based on the second body diode on time tFD2 of the current switching cycle TC switching cycle by switching cycle. In this fashion, the second zero-cross threshold signal VTH2 of the next switching cycle TN may be able to reflect the actual zero-cross point of the second rectifier current ISR2 more and more accurately. Consequently, the synchronous rectifying control circuit 160 may be able to control the turn off moment of the second synchronous rectifier SR2 more accurately.

Figure 5:
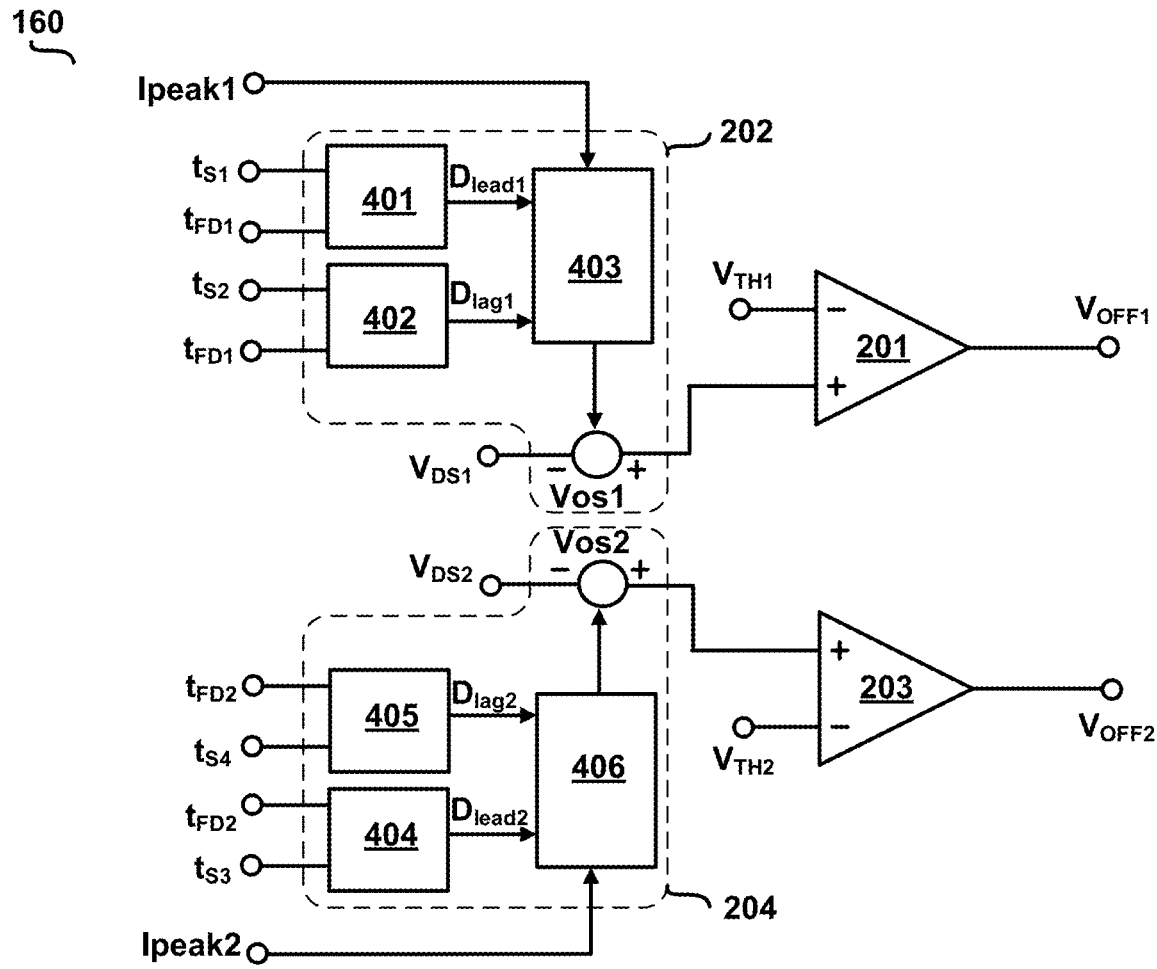
FIG. 5 illustrates a schematic diagram of the synchronous rectifying control circuit 160 in accordance with an alternative embodiment of the present invention.

FIG. 5 illustrates a schematic diagram of the synchronous rectifying control circuit 160 in accordance with an alternative embodiment of the present invention. The synchronous rectifying control circuit 160 may comprise a first synchronous rectifier OFF control module and a second synchronous rectifier OFF control module. Similar as the embodiment shown in FIG. 2, the first synchronous rectifier OFF control module may comprise a first comparison circuit 201 and a first zero-cross threshold regulation circuit 202. The second synchronous rectifier OFF control module may comprise a second comparison circuit 203 and a second zero-cross threshold regulation circuit 204. The first comparison circuit 201 and the second comparison circuit 203 in FIG. 5 may be the same as described with reference to FIG. 2 and thus will not be addressed again. Different from the embodiment of FIG. 2, the first zero-cross threshold regulation circuit 202 of FIG. 5 may further be configured to receive a first time indication signal (also labeled as tFD1 for simplicity) indicative of the first body diode on time tFD1 and to adjust the first zero-cross threshold signal VTH1 based on the first body diode on time tFD1. When the first body diode on time tFD1 is longer than the first predetermined time duration tS1, the first zero-cross threshold regulation circuit 202 is configured to adjust the magnitude of the first zero-cross threshold signal VTH1 to decrease. When the first body diode on time tFD1 is shorter than the second predetermined time duration tS2, the first zero-cross threshold regulation circuit 202 is configured to adjust the magnitude of the first zero-cross threshold signal VTH1 to increase. The second zero-cross threshold regulation circuit 204 of FIG. 5 may further be configured to receive a second time indication signal (also labeled as tFD2 for simplicity) indicative of the second body diode on time tFD2 and to adjust the second zero-cross threshold signal VTH2 based on the second body diode on time tFD2. When the second body diode on time tFD2 is longer than the third predetermined time duration tS3, the second zero-cross threshold regulation circuit 204 is configured to adjust the magnitude of the second zero-cross threshold signal VTH2 to decrease. When the second body diode on time tFD2 is shorter than the fourth predetermined time duration tS4, the second zero-cross threshold regulation circuit 204 is configured to adjust the magnitude of the second zero-cross threshold signal VTH2 to increase.

In the exemplary embodiment of FIG. 5, the first zero-cross threshold regulation circuit 202 may comprise a first zero-cross leading determination circuit 401, a first zero-cross lagging determination circuit 402 and a first adjusting operation circuit 403. The first zero-cross leading determination circuit 401 may be configured to receive the first time indication signal tFD1, and to compare the first time indication signal tFD1 with a first reference time indication signal (also labeled with tS1 for simplicity) indicative of the first predetermined time duration tS1 to generate a first zero-cross leading determination signal Dlead1. When the first body diode on time tFD1 is longer than the first predetermined time duration tS1, the first zero-cross leading determination signal Dlead1 has a first logic state (e.g. logic high). When the first body diode on time tFD1 is shorter than the first predetermined time duration tS1, the first zero-cross leading determination signal Dlead1 has a second logic state (e.g. logic low). The first zero-cross lagging determination circuit 402 may be configured to receive the first time indication signal tFD1, and to compare the first time indication signal tFD1 with a second reference time indication signal (also labeled with tS2 for simplicity) indicative of the second predetermined time duration tS2 to generate a first zero-cross lagging determination signal Dlag1. When the first body diode on time tFD1 is shorter than the second predetermined time duration tS2, the first zero-cross lagging determination signal Dlag1 has a first logic state (e.g. logic high). When the first body diode on time tFD1 is longer than the second predetermined time duration tS2, the first zero-cross lagging determination signal Dlag1 has a second logic state (e.g. logic low). The first adjusting operation circuit 403 may be configured to respectively receive the first peak current detection signal Ipeak1, the first zero-cross leading determination signal Dlead1 and the first zero-cross lagging determination signal Dlag1, and to adjust the magnitude of the first zero-cross threshold signal VTH1 to vary in the same direction as the peak value of the first rectifier current ISR1, and to adjust the magnitude of the first zero-cross threshold signal VTH1 to decrease in response to the first logic state of the first zero-cross leading determination signal Dlead1 while to increase in response to the first logic state of the first zero-cross lagging determination signal Dlag1.

In accordance with an embodiment of the present invention, the first zero-cross threshold regulation circuit 202 of FIG. 5 may be configured to adjust the magnitude of the first zero-cross threshold signal VTH1 through superposing a first threshold bias Vos1 to the first drain-source voltage signal VDS1 or to the first zero-cross threshold signal VTH1. In the example of FIG. 5, the first threshold bias Vos1 is superposed to the first drain-source voltage signal VDS1. The first adjusting operation circuit 403 may be configured to adjust the magnitude of the first threshold bias Vos1 to vary in the same direction as the peak value of the first rectifier current ISR1, and to adjust the magnitude of the first threshold bias Vos1 to decrease in response to the first logic state of the first zero-cross leading determination signal Dlead1 while to increase in response to the first logic state of the first zero-cross lagging determination signal Dlag1.

In the exemplary embodiment of FIG. 5, the second zero-cross threshold regulation circuit 204 may comprise a second zero-cross leading determination circuit 404, a second zero-cross lagging determination circuit 405 and a second adjusting operation circuit 406. The second zero-cross leading determination circuit 404 may be configured to receive the second time indication signal tFD2, and to compare the second time indication signal tFD2 with a third reference time indication signal (also labeled with tS3 for simplicity) indicative of the third predetermined time duration tS3 to generate a second zero-cross leading determination signal Dlead2. When the second body diode on time tFD2 is longer than the third predetermined time duration tS3, the second zero-cross leading determination signal Dlead2 has a first logic state (e.g. logic high). When the second body diode on time tFD2 is shorter than the third predetermined time duration tS3, the second zero-cross leading determination signal Dlead2 has a second logic state (e.g. logic low). The second zero-cross lagging determination circuit 405 may be configured to receive the second time indication signal tFD2, and to compare the second time indication signal tFD2 with a fourth reference time indication signal (also labeled with tS4 for simplicity) indicative of the fourth predetermined time duration tS4 to generate a second zero-cross lagging determination signal Dlag2. When the second body diode on time tFD2 is shorter than the fourth predetermined time duration tS4, the second zero-cross lagging determination signal Dlag2 has a first logic state (e.g. logic high). When the second body diode on time tFD2 is longer than the fourth predetermined time duration tS4, the second zero-cross lagging determination signal Dlag2 has a second logic state (e.g. logic low). The second adjusting operation circuit 406 may be configured to respectively receive the second peak current detection signal Ipeak2, the second zero-cross leading determination signal Dlead2 and the second zero-cross lagging determination signal Dlag2, and to adjust the magnitude of the second zero-cross threshold signal VTH2 to vary in the same direction as the peak value of the second rectifier current ISR2, and to adjust the magnitude of the second zero-cross threshold signal VTH2 to decrease in response to the first logic state of the second zero-cross leading determination signal Dlead2 while to increase in response to the second logic state of the second zero-cross lagging determination signal Dlag2.

In accordance with an embodiment of the present invention, the second zero-cross threshold regulation circuit 204 of FIG. 5 may be configured to adjust the magnitude of the second zero-cross threshold signal VTH2 through superposing a second threshold bias Vos2 to the second drain-source voltage signal VDS2 or to the second zero-cross threshold signal VTH2. In the example of FIG. 5, the second threshold bias Vos2 is superposed to the second drain-source voltage signal VDS2. The second adjusting operation circuit 406 may be configured to adjust the magnitude of the second threshold bias Vos2 to vary in the same direction as the peak value of the second rectifier current ISR2, and to adjust the magnitude of the second threshold bias Vos2 to decrease in response to the first logic state of the second zero-cross leading determination signal Dlead2 while to increase in response to the first logic state of the second zero-cross lagging determination signal Dlag2.

Figure 6:
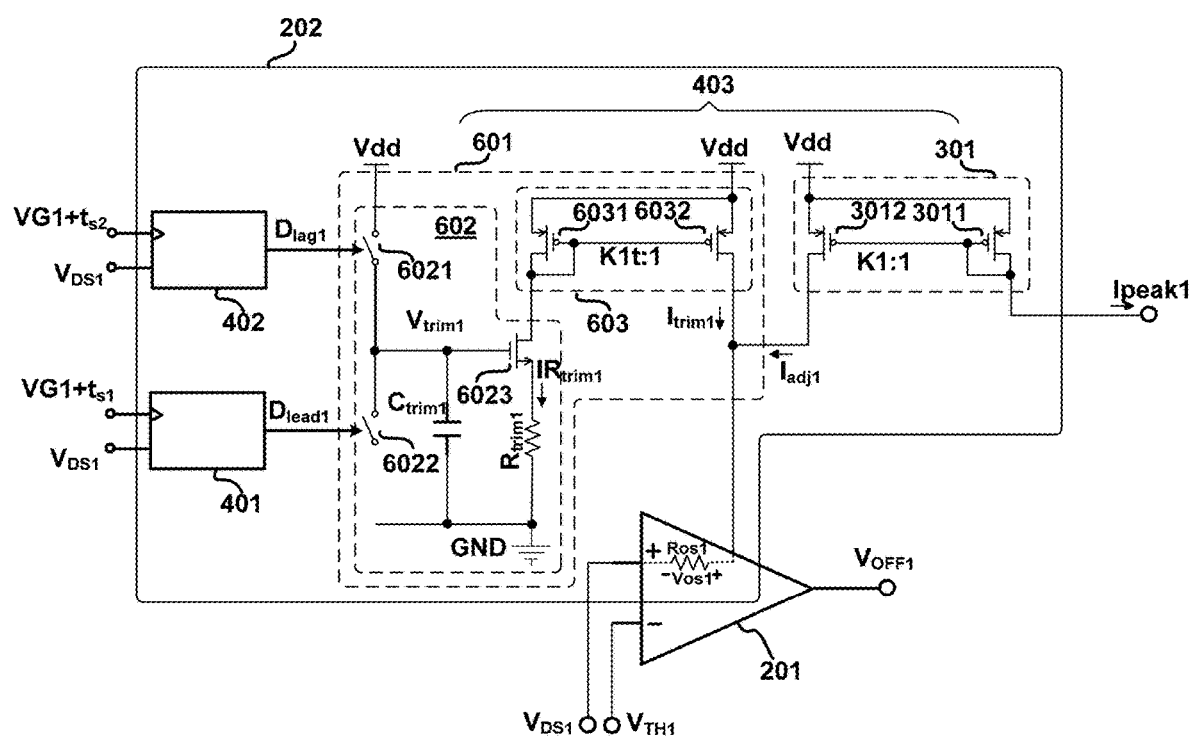
FIG. 6 illustrates a more detailed schematic diagram showing a first synchronous rectifier OFF control module in accordance with an embodiment of the present invention.

FIG. 6 illustrates a more detailed schematic diagram showing a first synchronous rectifier OFF control module in accordance with an embodiment of the present invention. In this exemplary embodiment, the first zero-cross leading determination circuit 401 may comprise a first edge-triggered flip-flop having a first flip-flop clock input terminal, a first flip-flop data input terminal and a first flip-flop output terminal. The first edge triggered flip-flop may be configured to receive a first gate control delay signal (VG1+tS1) at the first flip-flop clock input terminal, to receive the first drain-source voltage signal VDS1 at the first flip-flop data input terminal, and to provide the first zero-cross leading determination signal Dlead1 at the first flip-flop output terminal. The first gate control delay signal (VG1+tS1) may be provided by delaying the first gate control signal VG1 with the first predetermined time duration tS1. If the first edge-triggered flip-flop detects at a falling edge of the first gate control delay signal (VG1+tS1) that the first drain-source voltage signal VDS1 is LOW (logic low), which indicates that the first body diode on time tFD1 is longer than the first predetermined on time duration tS1, it sets the first zero-cross leading determination signal Dlead1 to the first logic state (e.g. logic high), else it maintains the first zero-cross leading determination signal Dlead1 at the second logic state (e.g. logic low). The first zero-cross lagging determination circuit 402 may comprise a second edge-triggered flip-flop having a second flip-flop clock input terminal, a second flip-flop data input terminal and a second flip-flop output terminal. The second edge triggered flip-flop may be configured to receive a second gate control delay signal (VG1+tS2) at the second flip-flop clock input terminal, to receive the first drain-source voltage signal VDS1 at the second flip-flop data input terminal, and to provide the first zero-cross lagging determination signal Dlag1 at the second flip-flop output terminal. The second gate control delay signal (VG1+tS2) may be provided by delaying the first gate control signal VG1 with the second predetermined time duration tS2. If the second edge-triggered flip-flop detects at a falling edge of the second gate control delay signal (VG1+tS2) that the first drain-source voltage signal VDS1 is HIGH (logic high), which indicates that the first body diode on time tFD1 is shorter than the second predetermined on time duration tS2, it sets the first zero-cross lagging determination signal Dlag1 to the first logic state (e.g. logic high), else it maintains the first zero-cross lagging determination signal Dlag1 at the second logic state (e.g. logic low). One of ordinary skill in the art should understand that to implement the first zero-cross leading determination circuit 401 and the first zero-cross lagging determination circuit 402 respectively with the first edge-triggered flip-flop and the second edge-triggered flip-flop is just illustrative and not intended to be limiting. For instance, the first zero-cross leading determination circuit 401 may be implemented with other circuit/module that can compare the first body diode on time tFD1 with the first predetermined time duration tS1. The first zero-cross lagging determination circuit 402 may be implemented with other circuit/module that can compare the first body diode on time tFD1 with the second predetermined time duration tS2.

The first adjusting operation circuit 403 may comprise a first current mirror circuit 301, a first trimming current generation circuit 601 and a first bias resistor Ros1. The first current mirror circuit 301 may be the same as described with reference to FIG. 3 and thus will not be addressed herein again. The first trimming current generation circuit 601 may be configured to respectively receive the first zero-cross leading determination signal Dlead1 and the first zero-cross lagging determination signal Dlag1, to adjust a first trimming voltage Vtrim1 through controlling the discharging and charging of a first trimming capacitor Ctrim1 respectively by the first zero-cross leading determination signal Dlead1 and the first zero-cross lagging determination signal Dlag1, and to generate a first trimming current Itrim1 through applying the first trimming voltage Vtrim1 across a first trimming resistor Rtrim1. The first trimming current generation circuit 601 may be configured to trim the first trimming current Itrim1 to decrease in response to the first logic state of the first zero-cross leading determination signal Dlead1, and to trim the first trimming current Itrim1 to increase in response to the first logic state of the first zero-cross lagging determination signal Dlag1.

In an embodiment of the present invention, the first trimming current generation circuit 601 may comprise a first initial trimming current generator 602 and a first trimming current mirror 603. The first initial trimming current generator 602 may comprise a first controllable switch 6021, a second controllable switch 6022, the first trimming capacitor Ctrim1, the first trimming resistor Rtrim1 and a first trimming transistor 6023. The first controllable switch 6021 and the second controllable switch 6022 may have a common connection and may be coupled in series between an internal supply potential Vdd and the reference ground GND, wherein a control terminal of the first controllable switch 6021 is configured to receive the first zero-cross lagging determination signal Dlag1 and a control terminal of the second controllable switch 6022 is configured to receive the first zero-cross leading determination signal Dlead1. A first terminal of the first trimming capacitor Ctrim1 may be coupled to the common connection of the first controllable switch 6021 and the second controllable switch 6022, and a second terminal of the first trimming capacitor Ctrim1 may be connected to the reference ground GND. A control terminal of the first trimming transistor 6023 may be coupled to the first terminal of the first trimming capacitor Ctrim1 to receive the first trimming voltage Vtrim1, a first terminal of the first trimming transistor 6023 may be coupled to the reference ground GND through the first trimming resistor Rtrim1, and a second terminal of the first trimming transistor 6023 may be configured to provide a first initial trimming current IRtrim1. The first controllable switch 6021 may be closed in response to the first logic state of the first zero-cross lagging determination signal Dlag1 to charge the first trimming capacitor Ctrim1 to trim the first initial trimming current IRtrim1 to increase and may be open in response to the second logic state of the first zero-cross lagging determination signal Dlag1. The second controllable switch 6022 may be closed in response to the first logic state of the first zero-cross leading determination signal Dlead1 to discharge the first trimming capacitor Ctrim1 to trim the first initial trimming current IRtrim1 to decrease and may be open in response to the second logic state of the first zero-cross leading determination signal Dlead1. The first trimming current mirror 603 may be configured to receive the first initial trimming current IRtrim1, and to mirror the first initial trimming current IRtrim1 with a first mirror coefficient Kt1 to provide the first trimming current Itrim1 (i.e. Itrim1=Kt1* IRtrim1). In an embodiment, the first trimming current mirror 603 may comprise e.g. a transistor 6031 and a transistor 6032 connected as shown in FIG. 6.

The first bias resistor Ros1 may have a first terminal configured to receive the first drain-source voltage signal VDS1 or the first zero-cross threshold signal VTH1 (in the example of FIG. 6, it is illustrated to receive the first drain-source voltage signal VDS1), and a second terminal configured to receive the first adjusting current Iadj1 and the first trimming current Itrim1. The first bias resistor Ros1 is configured to provide a voltage drop resulted from both the first adjusting current Iadj1 and the first trimming current Itrim1 flowing through the first bias resistor Ros1 as the first threshold bias Vos1. In accordance with an embodiment of the present invention, the first offset resistor Ros1 of the first comparison circuit 201 may be used as the first bias resistor Ros1. One of ordinary skill in the art should understand that this is not intended to be limiting. In other embodiments, the first bias resistor Ros1 may comprise other alternative elements inside or outside the first comparison circuit 201 that could be used as a resistor.

Figure 7:
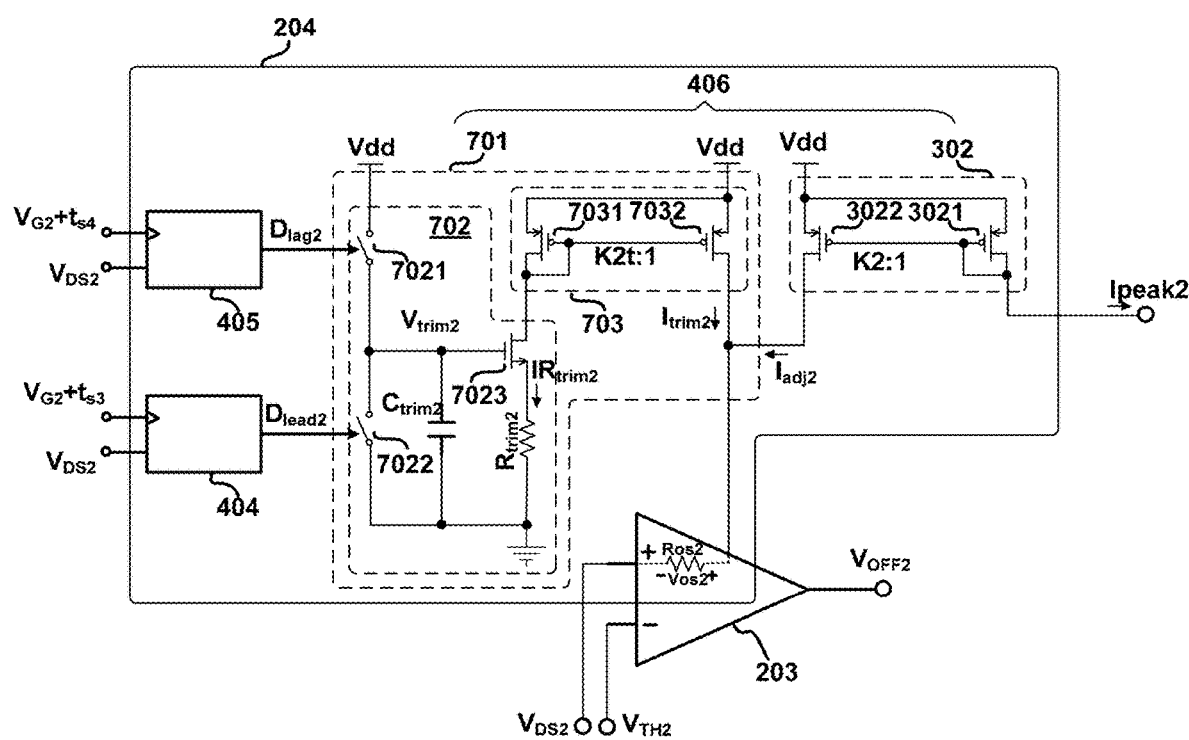
FIG. 7 illustrates a more detailed schematic diagram showing a second synchronous rectifier OFF control module in accordance with an embodiment of the present invention.

FIG. 7 illustrates a more detailed schematic diagram showing a second synchronous rectifier OFF control module in accordance with an embodiment of the present invention. In this exemplary embodiment, the second zero-cross leading determination circuit 404 may comprise a third edge-triggered flip-flop having a third flip-flop clock input terminal, a third flip-flop data input terminal and a third flip-flop output terminal. The third edge triggered flip-flop may be configured to receive a third gate control delay signal (VG2+tS3) at the third flip-flop clock input terminal, to receive the second drain-source voltage signal VDS2 at the third flip-flop data input terminal, and to provide the second zero-cross leading determination signal Dlead2 at the third flip-flop output terminal. The third gate control delay signal (VG2+tS3) may be provided by delaying the second gate control signal VG2 with the third predetermined time duration tS3. If the third edge-triggered flip-flop detects at a falling edge of the third gate control delay signal (VG2+tS3) that the second drain-source voltage signal VDS2 is LOW (logic low), which indicates that the second body diode on time tFD2 is longer than the third predetermined on time duration tS3, it sets the second zero-cross leading determination signal Dlead2 to the first logic state (e.g. logic high), else it maintains the second zero-cross leading determination signal Dlead2 at the second logic state (e.g. logic low). The second zero-cross lagging determination circuit 405 may comprise a fourth edge-triggered flip-flop having a fourth flip-flop clock input terminal, a fourth flip-flop data input terminal and a fourth flip-flop output terminal. The fourth edge triggered flip-flop may be configured to receive a fourth gate control delay signal (VG2+tS4) at the fourth flip-flop clock input terminal, to receive the second drain-source voltage signal VDS2 at the fourth flip-flop data input terminal, and to provide the second zero-cross lagging determination signal Dlag2 at the fourth flip-flop output terminal. The fourth gate control delay signal (VG2+tS4) may be provided by delaying the second gate control signal VG2 with the fourth predetermined time duration tS4. If the fourth edge-triggered flip-flop detects at a falling edge of the fourth gate control delay signal (VG2+tS3) that the second drain-source voltage signal VDS2 is HIGH (logic high), which indicates that the second body diode on time tFD2 is shorter than the fourth predetermined on time duration tS4, it sets the second zero-cross lagging determination signal Dlag2 to the first logic state (e.g. logic high), else it maintains the second zero-cross lagging determination signal Dlag2 at the second logic state (e.g. logic low). One of ordinary skill in the art should understand that to implement the third zero-cross leading determination circuit 404 and the second zero-cross lagging determination circuit 405 respectively with the third edge-triggered flip-flop and the fourth edge-triggered flip-flop is just illustrative and not intended to be limiting. For instance, the second zero-cross leading determination circuit 404 may be implemented with other circuit/module that can compare the second body diode on time tFD2 with the third predetermined time duration tS3. The second zero-cross lagging determination circuit 405 may be implemented with other circuit/module that can compare the second body diode on time tFD2 with the fourth predetermined time duration tS4.

The second adjusting operation circuit 406 may comprise a second current mirror circuit 302, a second trimming current generation circuit 701 and a second bias resistor Ros2. The second current mirror circuit 302 may be the same as described with reference to FIG. 3 and thus will not be addressed herein again. The second trimming current generation circuit 701 may be configured to respectively receive the second zero-cross leading determination signal Dlead2 and the second zero-cross lagging determination signal Dlag2, to adjust a second trimming voltage Vtrim2 through controlling the discharging and charging of a second trimming capacitor Ctrim2 respectively by the second zero-cross leading determination signal Dlead2 and the second zero-cross lagging determination signal Dlag2, and to generate a second trimming current Itrim2 through applying the second trimming voltage Vtrim2 across a second trimming resistor Rtrim2. The second trimming current generation circuit 701 may be configured to trim the second trimming current Itrim2 to decrease in response to the first logic state of the second zero-cross leading determination signal Dlead2, and to trim the second trimming current Itrim2 to increase in response to the first logic state of the second zero-cross lagging determination signal Dlag2.

In an embodiment of the present invention, the second trimming current generation circuit 701 may comprise a second initial trimming current generator 702 and a second trimming current mirror 703. The second initial trimming current generator 702 may comprise a third controllable switch 7021, a fourth controllable switch 7022, the second trimming capacitor Ctrim2, the second trimming resistor Rtrim2 and a second trimming transistor 7023. The third controllable switch 7021 and the fourth controllable switch 7022 may have a common connection and may be coupled in series between an internal supply potential Vdd and the reference ground GND, wherein a control terminal of the third controllable switch 7021 is configured to receive the second zero-cross lagging determination signal Dlag2 and a control terminal of the fourth controllable switch 7022 is configured to receive the second zero-cross leading determination signal Dlead2. A first terminal of the second trimming capacitor Ctrim2 may be coupled to the common connection of the third controllable switch 7021 and the fourth controllable switch 7022, and a second terminal of the first trimming capacitor Ctrim1 may be connected to the reference ground GND. A control terminal of the second trimming transistor 7023 may be coupled to the first terminal of the second trimming capacitor Ctrim2 to receive the second trimming voltage Vtrim2, a first terminal of the second trimming transistor 7023 may be coupled to the reference ground GND through the second trimming resistor Rtrim2, and a second terminal of the second trimming transistor 7023 may be configured to provide a second initial trimming current (Rtrim2. The third controllable switch 7021 may be closed in response to the first logic state of the second zero-cross lagging determination signal Dlag2 to charge the second trimming capacitor Ctrim2 to trim the second initial trimming current IRtrim2 to increase and may be open in response to the second logic state of the second zero-cross lagging determination signal Dlag2. The fourth controllable switch 7022 may be closed in response to the first logic state of the second zero-cross leading determination signal Dlead2 to discharge the second trimming capacitor Ctrim2 to trim the second initial trimming current IRtrim2 to decrease and may be open in response to the second logic state of the second zero-cross leading determination signal Dlead2. The second trimming current mirror 703 may be configured to receive the second initial trimming current IRtrim2, and to mirror the second initial trimming current IRtrim2 with a second mirror coefficient Kt2 to provide the second trimming current Itrim2 (i.e. Itrim2=Kt2* IRtrim2). In an embodiment, the second trimming current mirror 703 may comprise e.g. a transistor 7031 and a transistor 7032 connected as shown in FIG. 7.

The second bias resistor Ros2 may have a first terminal configured to receive the second drain-source voltage signal VDS2 or the second zero-cross threshold signal VTH2 (in the example of FIG. 7, it is illustrated to receive the second drain-source voltage signal VDS2), and a second terminal configured to receive the second adjusting current Iadj2 and the second trimming current Itrim2. The second bias resistor Ros2 is configured to provide a voltage drop resulted from both the second adjusting current Iadj2 and the second trimming current Itrim2 flowing through the second bias resistor Ros2 as the second threshold bias Vos2. In accordance with an embodiment of the present invention, the second offset resistor Ros2 of the second comparison circuit 203 may be used as the second bias resistor Ros2. One of ordinary skill in the art should understand that this is not intended to be limiting. In other embodiments, the second bias resistor Ros2 may comprise other alternative elements inside or outside the second comparison circuit 203 that could be used as a resistor.

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. The LLC resonant converter 100 is only one exemplary circuit that may use synchronous rectifiers and is not intended to be limiting. In other embodiments, the synchronous rectifier OFF control module and associated control schemes may be applied to other topologies that feature the synchronous rectification function such as synchronous rectification push-pull topology, synchronous rectification half bridge topology, and synchronous rectification full bridge topology etc. Many of the elements of one embodiment may be combined with other embodiments in addition to or in lieu of the elements of the other embodiments. Accordingly, the present invention is not limited except as by the appended claims.

What is claimed is:

1. A synchronous rectifier OFF control module, comprising:
   a comparison circuit configured to receive a zero-cross threshold signal and a drain-source voltage signal indicative of a drain to source voltage of a synchronous rectifier, and to compare the drain-source voltage signal with the zero-cross threshold signal to determine whether a rectifier current flowing through the synchronous rectifier is crossing zero, wherein when the drain-source voltage signal reaches the zero-cross threshold signal, the synchronous rectifier OFF control module is configured to determine that the rectifier current is crossing zero and thus turns the synchronous rectifier OFF; and
   a zero-cross threshold regulation circuit configured to receive a peak current detection signal indicative of a peak value of the rectifier current, and to adjust the magnitude of the zero-cross threshold signal to vary in the same direction as the peak value of the rectifier current.

2. The synchronous rectifier OFF control module of claim 1, wherein the zero-cross threshold regulation circuit is configured to adjust the magnitude of the zero-cross threshold signal through superposing a threshold bias to the drain-source voltage signal or to the zero-cross threshold signal, and to regulate a magnitude of the threshold bias to increase with increase in the peak value of the rectifier current and to decrease with decrease in the peak value of the rectifier current.

3. The synchronous rectifier OFF control module of claim 1, wherein the zero-cross threshold regulation circuit comprises:
- a current mirror circuit configured to receive the peak current detection signal and to mirror the peak current detection signal with a first coefficient to provide an adjusting current; and
- a bias resistor having a first terminal configured to receive the drain-source voltage signal or the zero-cross threshold signal and a second terminal configured to receive the adjusting current, and to provide a voltage drop resulted from the adjusting current flowing through the bias resistor as the threshold bias.

4. The synchronous rectifier OFF control module of claim 3, wherein the comparison circuit has an offset resistor, and wherein the offset resistor is used as the bias resistor.

5. The synchronous rectifier OFF control module of claim 1, wherein
- the zero-cross threshold regulation circuit is further configured to receive a time indication signal indicative of a body diode on time, wherein the body diode on time represents the on time duration of a body diode of the synchronous rectifier when the synchronous rectifier is turned off; and wherein
- when the body diode on time is longer than a first predetermined time duration, the zero-cross threshold regulation circuit is configured to adjust the magnitude of the zero-cross threshold signal to decrease; and wherein
- when the body diode on time is shorter than a second predetermined time duration, the zero-cross threshold regulation circuit is configured to adjust the magnitude of the zero-cross threshold signal to increase.

6. The synchronous rectifier OFF control module of claim 5, wherein the zero-cross threshold regulation circuit is configured to adjust the magnitude of the zero-cross threshold signal through superposing a threshold bias to the drain-source voltage signal or to the zero-cross threshold signal, and to regulate a magnitude of the threshold bias to vary in the same direction as the peak value of the rectifier current, and to adjust the magnitude of the threshold bias to decrease when the body diode on time is longer than the first predetermined time duration while to increase when the body diode on time is shorter than the second predetermined time duration.

7. The synchronous rectifier OFF control module of claim 1, wherein the synchronous rectifier has a body diode, and wherein the zero-cross threshold regulation circuit comprises:
- a zero-cross leading determination circuit configured to receive a time indication signal indicative of a "body diode on time", and to compare the time indication signal with a first reference time indication signal indicative of a first predetermined time duration to generate a zero-cross leading determination signal, wherein the "body diode on time" represents the on time duration of the body diode of the synchronous rectifier when the synchronous rectifier is turned off, and wherein when the "body diode on time" is longer than the first predetermined time duration, the zero-cross leading determination signal has a first logic state, and wherein when the "body diode on time" is shorter than the first predetermined time duration, the zero-cross leading determination signal has a second logic state;
- a zero-cross lagging determination circuit configured to receive the time indication signal, and to compare the time indication signal with a second reference time indication signal indicative of a second predetermined time duration to generate a zero-cross lagging determination signal, wherein when the "body diode on time" is shorter than the second predetermined time duration, the zero-cross lagging determination signal has a third logic state, and wherein when the "body diode on time" is longer than the second predetermined time duration, the zero-cross lagging determination signal has a fourth logic state; and
- an adjusting operation circuit configured to respectively receive the peak current detection signal, the zero-cross leading determination signal and the zero-cross lagging determination signal, and to adjust the magnitude of the zero-cross threshold signal to vary in the same direction as the peak value of the rectifier current, and to adjust the magnitude of the zero-cross threshold signal to decrease in response to the first logic state of the zero-cross leading determination signal while to increase in response to the third logic state of the zero-cross lagging determination signal.

8. The synchronous rectifier OFF control module of claim 7, wherein the adjusting operation circuit is configured to adjust the magnitude of the zero-cross threshold signal through superposing a threshold bias to the drain-source voltage signal or to the zero-cross threshold signal, to regulate a magnitude of the threshold bias to vary in the same direction as the peak value of the rectifier current, and to adjust the magnitude of the threshold bias to decrease in response to the first logic state of the zero-cross leading determination signal while to increase in response to the third logic state of the zero-cross lagging determination signal.

9. The synchronous rectifier OFF control module of claim 7, wherein
- the zero-cross leading determination circuit comprises a first edge-triggered flip-flop having a first flip-flop clock input terminal configured to receive a first gate control delay signal, a first flip-flop data input terminal configured to receive the first drain-source voltage signal, and a first flip-flop output terminal configured to provide the first zero-cross leading determination signal, wherein the first gate control delay signal is provided by delaying a gate control signal of the synchronous rectifier with the first predetermined time duration, and wherein if the first edge-triggered flip-flop detects at a falling edge of the first gate control delay signal that the drain-source voltage signal is LOW, it sets the zero-cross leading determination signal to the first logic state, else it maintains the zero-cross leading determination signal at the second logic state; and wherein
- the zero-cross lagging determination circuit comprises a second edge-triggered flip-flop having a second flip-flop clock input terminal configured to receive a second gate control delay signal, a second flip-flop data input terminal configured to receive the drain-source voltage signal, and a second flip-flop output terminal configured to provide the zero-cross lagging determination signal, wherein the second gate control delay signal is provided by delaying the gate control signal of the synchronous rectifier with the second predetermined time duration, and wherein if the second edge-triggered flip-flop detects at a falling edge of the second gate control delay signal that the drain-source voltage signal is HIGH, it sets the zero-cross lagging determination signal to the third logic state, else it maintains the zero-cross lagging determination signal at the fourth logic state.

10. The synchronous rectifier OFF control module of claim 7, wherein the adjusting operation circuit comprises:
   a current mirror circuit configured to receive the peak current detection signal and to mirror the peak current detection signal with a first coefficient to provide an adjusting current;
   a trimming current generation circuit configured to respectively receive the zero-cross leading determination signal and the zero-cross lagging determination signal, to discharge a trimming capacitor in response to the first logic state of the zero-cross leading determination signal to decrease a trimming current, and to charge the trimming capacitor in response to the third logic state of the first zero-cross lagging determination signal to increase the trimming current; and
   a bias resistor having a first terminal configured to receive the drain-source voltage signal or the zero-cross threshold signal and a second terminal configured to receive the adjusting current and the trimming current.

11. The synchronous rectifier OFF control module of claim 10, wherein the trimming current generation circuit comprises:
   an initial trimming current generator comprising a first controllable switch, a second controllable switch, the trimming capacitor, a trimming resistor and a trimming transistor, wherein the first controllable switch and the second controllable switch have a common connection and are coupled in series between an internal supply potential and the reference ground, and wherein a control terminal of the first controllable switch is configured to receive the zero-cross lagging determination signal and a control terminal of the second controllable switch is configured to receive the zero-cross leading determination signal, and wherein the first controllable switch is closed in response to the third logic state of the zero-cross lagging determination signal and is open in response to the fourth logic state of the zero-cross lagging determination signal, and wherein the second controllable switch is closed in response to the first logic state of the zero-cross leading determination signal and is open in response to the second logic state of the zero-cross leading determination signal, and wherein the trimming capacitor has a first terminal coupled to the common connection of the first controllable switch and the second controllable switch, and a second terminal connected to the reference ground, and wherein the trimming transistor has a control terminal coupled to the first terminal of the trimming capacitor, a first terminal coupled to the reference ground through the trimming resistor, and a second terminal configured to provide an initial trimming current; and
   a trimming current mirror configured to receive the initial trimming current, and to mirror the initial trimming current with a predetermined mirror coefficient to provide the first trimming current.

12. A synchronous rectifying control circuit for controlling on and off switching of a first synchronous rectifier and a second synchronous rectifier, wherein
   the synchronous rectifying control circuit is configured to receive/detect a first drain-source voltage signal indicative of a drain to source voltage of the first synchronous rectifier and a second drain-source voltage signal indicative of a drain to source voltage of the second synchronous rectifier, and to compare the first drain-source voltage signal with a first zero-cross threshold signal to detect whether a first rectifier current flowing through the first synchronous rectifier is crossing zero, and to compare the second drain-source voltage signal with a second zero-cross threshold signal to detect whether a second rectifier current flowing through the second synchronous rectifier is crossing zero; and wherein
   the synchronous rectifying control circuit is further configured to receive a first peak current detection signal indicative of a peak value of the first rectifier current and a second peak current detection signal indicative of a peak value of the second rectifier current, and to adjust a magnitude of the first zero-cross threshold signal to vary in the same direction as the peak value of the first rectifier current, and to adjust a magnitude of the second zero-cross threshold signal to vary in the same direction as the peak value of the second rectifier current.

13. The synchronous rectifying control circuit of claim 12, comprising a first synchronous rectifier OFF control module, wherein the first synchronous rectifier OFF control module comprises:
   a first comparison circuit configured to receive the first zero-cross threshold signal and the first drain-source voltage signal, and to compare the first drain-source voltage signal with the first zero-cross threshold signal, wherein when the first drain-source voltage signal reaches the first zero-cross threshold signal, the first synchronous rectifier OFF control module is configured to determine that the first rectifier current is crossing zero and thus turn the first synchronous rectifier OFF; and
   a first zero-cross threshold regulation circuit configured to receive the first peak current detection signal, and to adjust the magnitude of the first zero-cross threshold signal to vary in the same direction as the peak value of the first rectifier current based on the first peak current detection signal.

14. The synchronous rectifying control circuit of claim 13, wherein the first zero-cross threshold regulation circuit is configured to adjust the magnitude of the first zero-cross threshold signal through superposing a first threshold bias to the first drain-source voltage signal or to the first zero-cross threshold signal, and to regulate a magnitude of the first threshold bias to increase with increase in the peak value of the first rectifier current and to decrease with decrease in the peak value of the first rectifier current.

15. The synchronous rectifying control circuit of claim 12, wherein:
   the synchronous rectifying control circuit is further configured to detect a first body diode on time of a first body diode of the first synchronous rectifier when the first synchronous rectifier is turned off, and to adjust the first zero-cross threshold signal based on the first body diode on time.

16. The synchronous rectifying control circuit of claim 15, wherein:

the synchronous rectifying control circuit is further configured to adjust the magnitude of the first zero-cross threshold signal to decrease once the first body diode on time is longer than a first predetermined time duration; and wherein the synchronous rectifying control circuit is further configured to adjust the magnitude of the first zero-cross threshold signal to increase once the first body diode on time is shorter than a second predetermined time duration.

17. The synchronous rectifying control circuit of claim 12, comprising a second synchronous rectifier OFF control module, wherein the second synchronous rectifier OFF control module comprises:

a second comparison circuit configured to receive the second zero-cross threshold signal and the second drain-source voltage signal, and to compare the second drain-source voltage signal with the second zero-cross threshold signal, wherein when the second drain-source voltage signal reaches the second zero-cross threshold signal, the second synchronous rectifier OFF control module is configured to determine that the second rectifier current is crossing zero and thus turn the second synchronous rectifier OFF; and a second zero-cross threshold regulation circuit configured to receive the second peak current detection signal, and to adjust the magnitude of the second zero-cross threshold signal to vary in the same direction as the peak value of the second rectifier current based on the second peak current detection signal.

18. The synchronous rectifying control circuit of claim 17, wherein the second zero-cross threshold regulation circuit is configured to adjust the magnitude of the second zero-cross threshold signal through superposing a second threshold bias to the second drain-source voltage signal or to the second zero-cross threshold signal, and to regulate a magnitude of the second threshold bias to increase with increase in the peak value of the second rectifier current and to decrease with decrease in the peak value of the second rectifier current.

19. The synchronous rectifying control circuit of claim 17, wherein:

the synchronous rectifying control circuit is further configured to detect a second body diode on time of a second body diode of the second synchronous rectifier when the second synchronous rectifier is turned off, and to adjust the second zero-cross threshold signal based on the second body diode on time.

20. The synchronous rectifying control circuit of claim 19, wherein:

the synchronous rectifying control circuit is further configured to adjust the magnitude of the second zero-cross threshold signal to decrease once the second body diode on time is longer than a third predetermined time duration; and wherein the synchronous rectifying control circuit is further configured to adjust the magnitude of the second zero-cross threshold signal to increase once the second body diode on time is shorter than a fourth predetermined time duration.

* * * * *